United States Patent
Del Carmen, Jr.

(10) Patent No.: US 8,810,157 B2
(45) Date of Patent: Aug. 19, 2014

(54) SIMPLIFIED CURRENT SENSE FOR BUCK LED DRIVER

(71) Applicant: Power Integrations, Inc., San Jose, CA (US)

(72) Inventor: Jose R. Del Carmen, Jr., San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 117 days.

(21) Appl. No.: 13/654,773

(22) Filed: Oct. 18, 2012

(65) Prior Publication Data

US 2014/0111113 A1    Apr. 24, 2014

(51) Int. Cl.
*H05B 37/02*    (2006.01)

(52) U.S. Cl.
USPC .......................................... 315/297; 315/307

(58) Field of Classification Search
USPC .......................... 315/291, 294, 297, 307–308
See application file for complete search history.

(56) References Cited

U.S. PATENT DOCUMENTS

| | | | |
|---|---|---|---|
| 8,004,204 B2* | 8/2011 | Nonaka et al. | 315/274 |
| 8,569,966 B2* | 10/2013 | Kumar et al. | 315/246 |
| 2003/0107332 A1* | 6/2003 | Newman et al. | 315/307 |
| 2011/0304279 A1* | 12/2011 | Felty | 315/307 |
| 2012/0262082 A1* | 10/2012 | Esaki et al. | 315/224 |

* cited by examiner

*Primary Examiner* — Jason M Crawford
(74) *Attorney, Agent, or Firm* — Morrison & Foerster LLP

(57) ABSTRACT

A current sense and feedback circuit is provided for a non-isolated Buck power converter to maintain constant current load regulation. The Buck converter may have a high side power switch and may include an input port, a switcher unit including a switch and a controller, an inductor coupled to the output, and a freewheeling diode for circulating the inductor current when the switch is open. The simplified current sense and feedback circuit of the power converter may include a current sense resistor module coupled to the freewheeling diode to provide a sense signal to the controller. The controller may also be coupled to the output of the power converter to sense an over voltage condition. The simplified current sense and feedback circuit may provide output regulation while maintaining a low component count, small size, and low loss that makes the power converter suitable for use in compact design applications.

20 Claims, 3 Drawing Sheets

SIMPLIFIED CURRENT SENSE FOR BUCK LED DRIVER

BACKGROUND

1. Field

The present disclosure relates generally to power converters and, more specifically, to non-isolated Buck converters.

2. Description of Related Art

Conventional wall outlets generally deliver a high voltage alternating current (ac) power that needs to be transformed to direct current (dc) power before being used to power many electronic devices. Switched mode power converters are commonly used due to their high efficiency, small size, low weight, and safety protection features, to convert the high voltage ac power to a regulated dc power. For example, switch mode power converters are commonly used in drive circuitry in the lighting industry to provide dc power for various lamp types, such as compact florescent lamps (CFLs), Halogen lamps, or light emitting diode (LED) bulbs.

Output regulation in a switch mode power converter is usually provided by sensing a feedback signal from the output of the converter and controlling the power converter in a closed loop. In different control methods, the feedback or control signal may be used to modulate a duty cycle of a switching waveform (referred to as pulse width modulation (PWM)), to change a switching frequency (referred to as pulse frequency modulation (PFM)), or to disable some of the cycles of the switching waveform generated by the power converter controller (referred to as on-off control). Any of these control methods would result in control of the dc output voltage or current versus the load and line variations.

The feedback signal can be directly or indirectly extracted from a sense circuit coupled to the dc output of the converter. In a non-isolated converter, the input of the power converter may be electrically coupled to the output (e.g., dc current is able to flow between input and output terminals of the converter) and the feedback signal may be directly measured in reference to a reference level of the controller. However, in an isolated converter, the output reference level (output ground) may be galvanically isolated (e.g., dc current is prevented from flowing between input and output terminals of the converter) from the controller and switch reference level (primary ground). In these examples, the output can be sensed indirectly through the use of an opto-coupler or magnetically coupled winding on the transformer core.

In applications where the output of the power converter can be accessible by the consumer, isolated converters are typically used to provide galvanic isolation between the output load and the input power line. However, in applications where the output of the power converter is not accessible by the consumer during normal operation, simpler non-isolated converters having lower component counts, weights, and sizes may be utilized. For example, non-isolated converters may be used in various lamp types, such as CFLs, Halogen lamps, or LED bulbs.

In a converter with a regulated output current, such as an LED driver, the current at the output may be monitored/sensed/measured to provide a feedback signal to the controller in order to control switching and the transfer of energy to the converter output. A typical way to measure the output current is to include a sense resistor at the output of the power converter such that the output current flows through the sense resistor. The resultant voltage across the sense resistor is proportional to the output current. However, the voltage drop across the sense resistor is typically large and often referenced to a voltage level different than that of the power converter controller. Thus, additional circuitry, such as an opto-coupler or a bias winding, is often needed to level shift the voltage across the sense resistor in order to interface with the controller.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
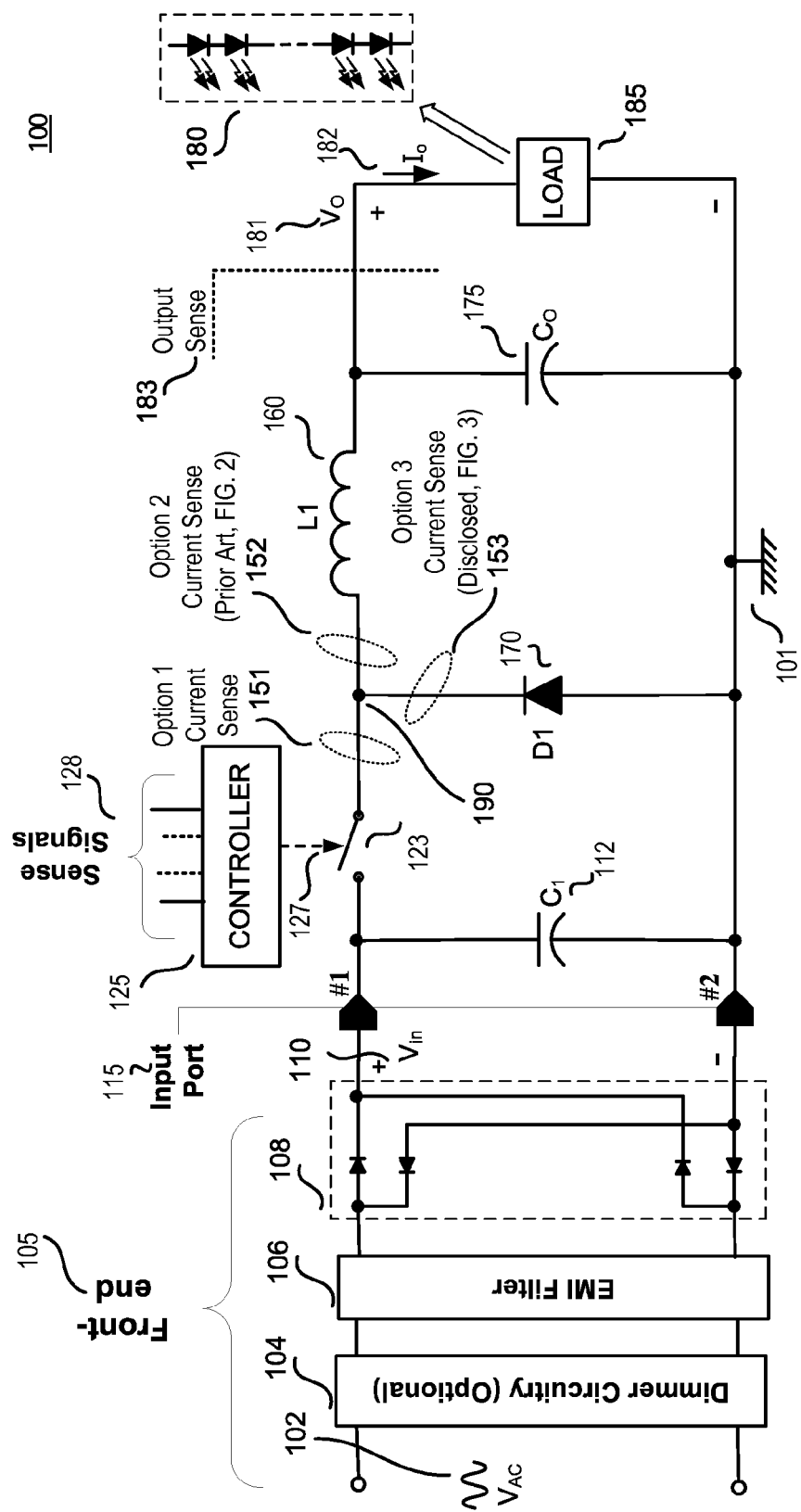
FIG. 1 is a general circuit diagram showing three possible locations to sense current for current regulation in an example Buck converter having a high side switch.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

In today's competitive world of energy, efficient lighting sources, such as fluorescent, CFL, halogen discharge lamps, and LED bulbs are popular due to their higher lighting efficiency, lower heat loss, and other advantages. In particular, LED lights have become popular for both indoor and outdoor illumination due to their improved color spectrum and efficient light generation. For operation of such advanced lighting sources, different types of switch mode power converters can provide a well-regulated current or voltage source to drive these lamps. One example type of converter that may be used is the Buck non-isolated power converter. This type of converter has a simple structure, low component count, small size, and low weight, making it a suitable candidate for these lighting applications.

In Buck converters, a controller controls switching of a switch to regulate the transfer of energy to the output of the converter. The controller may typically regulate the output in response to a feedback or sense signal representing the output current/voltage of the converter. If the sensed signal is not referenced to the controller reference level, then additional components may be required to shift the reference. Direct sensing of the output in a Buck converter with a high side switch in addition to the reference level shifting may result in power dissipation, efficiency reduction, and heat dissipation, often resulting in the requirement of a larger heat emission surface.

The present disclosure provides simplified sense circuitry for the current sense/measurement in non-isolated Buck converters with current regulation. In particular, embodiments of a Buck converter having a sense resistor in the path of a freewheeling diode (circulating current loop) for output current regulation (e.g., in an LED driver) are described herein. The simplified sense circuit may have a common reference level with the controller and may be characterized by less heat dissipation, high efficiency, low loss, reduced component count, and small size, allowing the circuit to be assembled in the bulb base of an LED lamp.

FIG. 1 is a general circuit diagram showing three possible locations to sense current for current regulation in an example Buck converter 100 having a high side switch. Buck converter 100 may be coupled to receive an ac line supply voltage $V_{AC}$ 102 at input terminals of front-end stage 105. Front-end stage 105 may include electromagnetic interference (EMI) filter block 106, full-bridge rectifier module 108, and optional dimmer circuitry 104. Dimmer circuitry 104 may include conventional dimming circuit components, such as a leading edge Phase Control Triac Dimmer The output of dimmer circuitry 104 may be coupled to the input of EMI filter 106. EMI filter 106 may include filter components known to those of ordinary skill in the art to filter unwanted noise from ac line supply voltage $V_{AC}$ 102. The output of EMI filter 106 may be coupled to full-bridge rectifier 108, which may include four diodes configured as shown in FIG. 1. However, it should be appreciated that other rectifier circuits may be used. Full-bridge rectifier 108 may output a rectified voltage $V_{in}$ 110. Rectified voltage $V_{in}$ 110 is positive with respect to a primary ground 101.

Buck converter 100 may further include input port 115 having a high side positive rail and a low side negative rail coupled to receive rectified voltage $V_{in}$ 110. An input filter capacitor $C_1$, 112 may also be included to provide a switching noise filtering function. For power converters with power factor correction (PFC), a small input filter capacitor $C_1$, 112 may be coupled between the high side positive rail and the low side negative rail of input port 115 to allow the voltage at input port 115 to substantially follow the rectified input voltage $V_{in}$ 110. In other words, the capacitance of input filter capacitor $C_1$, 112 may be selected such that when the rectified input voltage $V_{in}$ 110 reaches substantially zero, the voltage on the input filter capacitor $C_1$, 112 may also reach substantially zero. However, for power converters without PFC, the capacitance of input capacitor 112 may selected to be large enough such that a substantially dc voltage is applied at input port 115 of Buck converter 100.

Buck converter 100 may further include controller 125 coupled to control switch 123 via control signal 127. Controller 125 may be located on the high side positive rail and may be coupled to receive sense signals 128 representative of converter operational parameters. Controller 125 may be operable to control switching of switch 123 between an on state (e.g., a state in which current is substantially allowed to flow through switch 123) and an off state (e.g., a state in which current is substantially prevented from flowing through switch 123) based on the received sense signals 128. In some examples, an output sense or feedback signal 183 representative of output voltage $V_O$ 181 and/or output current $I_O$ 182 may be provided to controller 125 and may be included within sense signals 128. Output sense signal 183 may include a voltage signal or a current signal.

Buck converter 100 may further include diode D1 170, inductor L1 160, output capacitor $C_O$ 175, and load 185. In some examples, load 185 may include an LED string 180 having one or more LEDs.

In operation, when switch 123 is turned on, current may flow from input port 115 to inductor L1 160, thereby charging output capacitor $C_O$ 175 and providing power to load 185. When switch 123 is turned off, current has a freewheeling flow through the inductor L1 160, capacitor $C_O$ 175, and load 185. The current then returns through diode D1 170 (freewheeling diode), thereby ramping down while energy stored in inductor L1 160 discharges.

In a conventional Buck converter, switching of the switch may be controlled by a controller to regulate the output current or output voltage of the converter in response to a sense signal representative of the output. In a Buck converter with a high side switch, such as that shown in FIG. 1, the direct sensing of the dc output load current with a sense resistor may result in a voltage reference level different from that of the controller, requiring additional circuitry to shift the reference of the sense signal to match that of the controller. Direct measurement of the dc output load current may also result in power dissipation, thereby decreasing efficiency and increasing heat dissipation, resulting in a requirement for a larger area for heat transfer. The sensing of the dc output load current in a high side switch Buck converter may preferably be performed by sensing the pulsating current either in the inductor, in the switch, or in the freewheeling diode.

To regulate the load current $I_O$ 182 (in one example, LED current) of Buck converter 100 having on-off control, the current in one of the three optional locations coupled to a common coupling point 190 of inductor L1 160 and control switch 123 may be sensed/measured. Specifically, option 1, 151 includes sensing/measuring the current through switch 123, option 2, 152 includes sensing/measuring the current through inductor L1 160, and option 3, 153 includes sensing/measuring the current through freewheeling diode 170. Each option has advantages and disadvantages. For example, current sense option 2, 152, captures the whole switching cycle of ramp up and ramp down (rising and falling slopes) of the current, current sense option 1, 151 captures the ramp up (rising slope) of the current, and current sense option 3, 153 captures the ramp down (falling slope) of the current.

Figure 2:
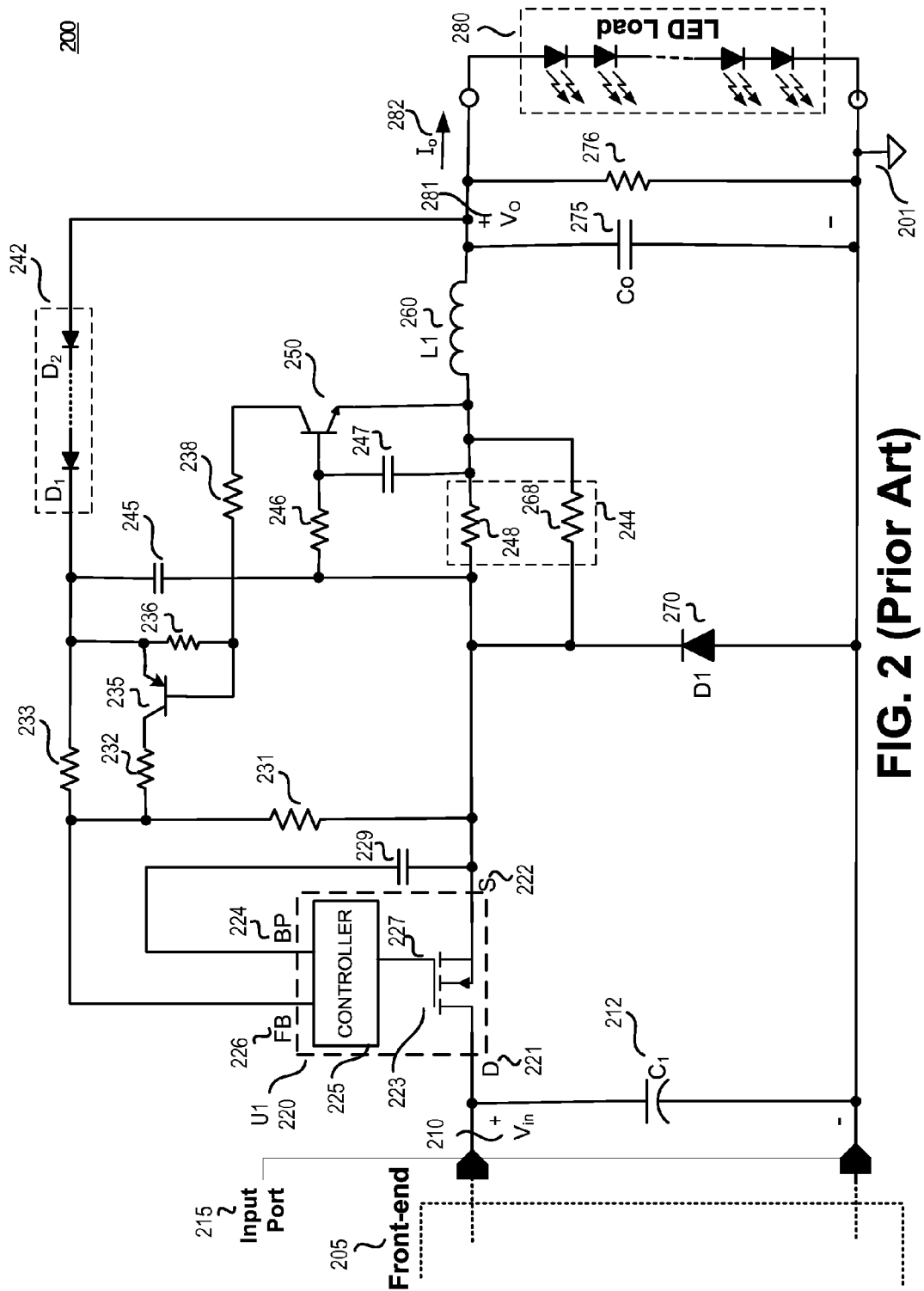
FIG. 2 is an example circuit diagram of a conventional Buck converter used as an LED driver that senses current in the path of the Buck inductor.

To illustrate, FIG. 2 shows a prior art Buck converter 200 for sensing the current in the inductor path (option 2, 152) of a Buck converter with a high side switch employing on-off control. Buck converter 200 may receive a rectified voltage $V_{in}$ 210 at input port 215 from front-end stage 205 similar to rectified voltage $V_{in}$ 110 in FIG. 1, received at input port 115 from front-end stage 105 of Buck converter 100. Buck converter 200 may further include an input filter capacitor $C_1$, 212 coupled between the high side positive rail and the low side negative rail (coupled to primary ground 201) of input port 215 to provide a switching noise filtering function.

Buck converter 200 includes a power train formed by a high side switcher unit 220, a freewheeling diode 270 (e.g., an ultrafast diode to minimize the amplitude of the metal-oxide-semiconductor field-effect transistor (MOSFET) turn-on spike), an output inductor 260, and an output capacitor 275. The remaining components of Buck converter 200 may be used for sensing the output (e.g., output voltage $V_O$ 281 and/ or output current $I_O$ 282) of the converter and will be described in greater detail below.

The high side switcher unit U1 220 may include a controlled switch that, in this example, includes MOSFET 223 and that may be integrated in a monolithic or hybrid structure with the controller 225 within the integrated circuit (IC) package of switcher unit U1 220. As shown, switcher unit U1 220 is a 4-terminal device with drain terminal D 221, source terminal S 222, controller 225 bypass terminal BP 224, and feedback terminal FB 226. Current may be supplied to bypass terminal BP 224 from input port 215 via capacitor 229. Since the switcher unit U1 220 is a 4-terminal device having a single sensing terminal (feedback terminal FB 226), all information relating to sensing the output current during normal operation and output over voltage protection (OVP) at no-load are conveyed to feedback FB terminal 226 of switcher unit U1 220.

Inside the switcher unit U1 220, controller 225 regulates the output of Buck converter 200 by enabling and disabling the switching of switch 223 via control signal 227. During each enabled switching interval, switch 223 may be closed, causing the drain current to ramp up to a fixed internal current limit level. When current into the feedback terminal FB 226 exceeds a threshold (e.g., 49 µA), the next switching cycle may be disabled. By adjusting the ratio of enabled to disabled cycles (switching cycles), the amount of energy delivered to the output can be varied and the average output current may be controlled to maintain the regulation. In this example, both current and voltage feedback are used. The threshold current at feedback terminal 226 may be specified equivalent to a voltage (e.g., 1.65 V) allowing this terminal to be used as a voltage reference as well. Current feedback may limit the LED current during normal operation while voltage feedback may limit the output voltage in the event of the LED load being disconnected (e.g., during production testing).

During the off time of switch 223, the voltage across capacitor 245 is equal to the output voltage less the voltage drop across diode unit 242. Diode unit 242 may include a single high-voltage diode or may include multiple low-voltage rating diodes (e.g., diodes D1 and D2). Voltage across capacitor 245 may be divided by resistors 233 and 231 such that the voltage at the feedback terminal FB 226 may remain at the FB threshold voltage (e.g., 1.65 V) when the output voltage reaches its high value (e.g., 12~18V, corresponding to a time when load 280 is disconnected). Current feedback in normal operation is provided by sensing the voltage drop across sense resistors 248 and 268 of sense resistor module 244, which is filtered by resistor 246 and capacitor 247. Once the voltage drop across sense resistors 248 and 268 exceeds the breakdown threshold of transistor 250, both transistors 250 and 235 turn on, feeding an additional current from capacitor 245 through shunt resistor 232 into the feedback terminal FB 226. Resistor 276 may be included at the output of Buck converter 200 to provide a minimum load to ensure correct operation at no load conditions.

When transistor 250 becomes biased through sense resistors 248 and 268 and turns on, transistor 235 is subsequently biased by the voltage drop across resistor 236 (caused by the current passing through resistor 236, resistor 238, and transistor 250) to provide the shunt current through shunt resistor 232 into the feedback terminal FB 226.

This relatively complicated current sense circuit may be simplified by using the feedback terminal FB 226 to directly sense the voltage drop across sense resistors 248 and 268. However, due to the rather high voltage threshold (for example 1.65 V) of feedback terminal FB 226, a high dissipation would result. For example, assuming an LED current of 0.3 A and the threshold voltage of 1.65 V on feedback terminal FB 226, an approximate dissipation of 0.5 W inside the base of the LED lamp (e.g., a GU10 enclosure) may result. A dissipation value of this magnitude is unacceptable in the lighting industry.

Figure 3:
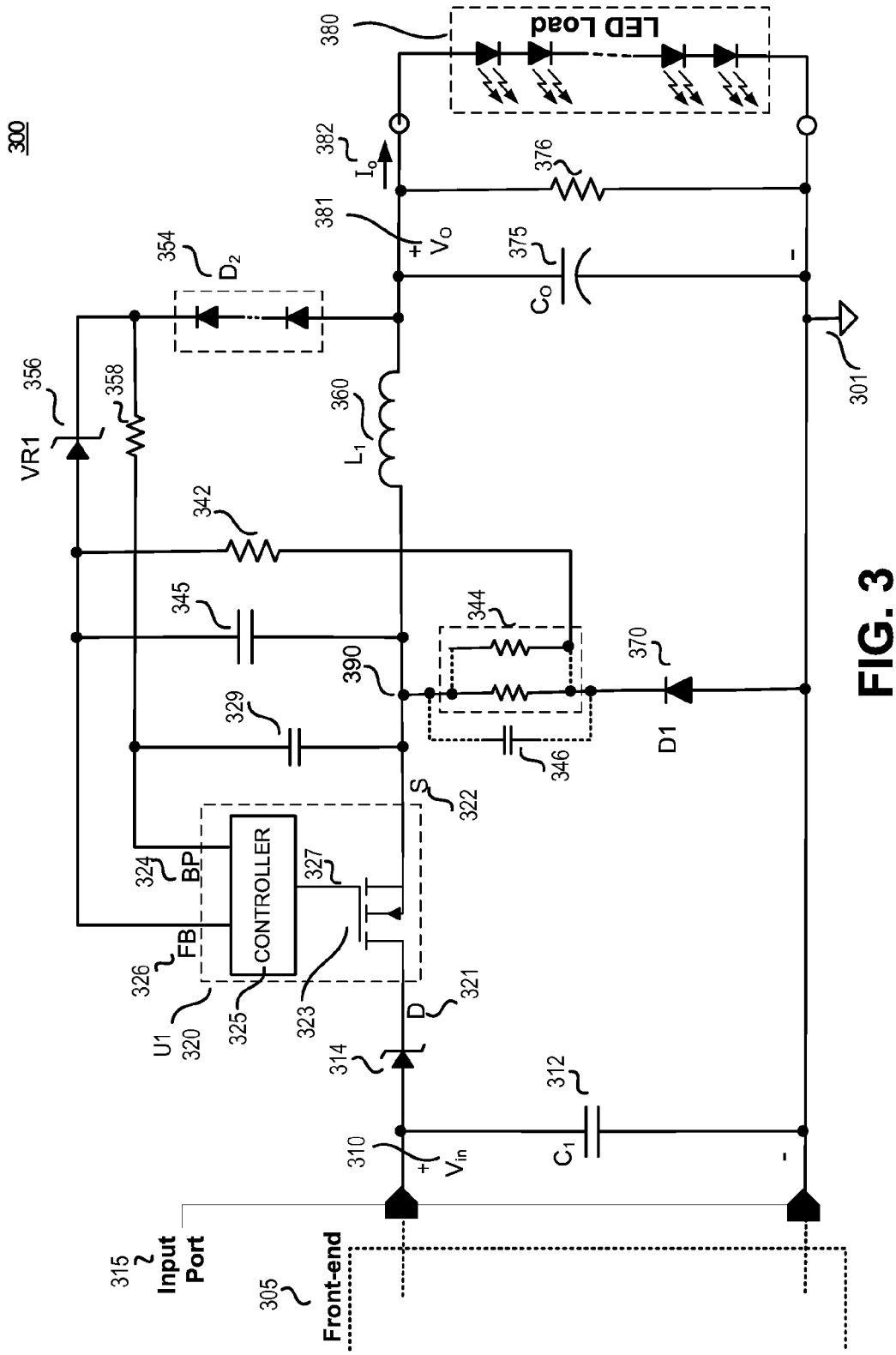
FIG. 3 illustrates a circuit diagram of an example Buck converter having simplified circuitry for sensing current in the path of the Buck freewheeling diode in accordance with various embodiments of the present disclosure.

FIG. 3 illustrates an example Buck converter 300 for sensing the current in the path of the freewheeling diode (option 3, 153) of a Buck converter with high side switch employing on-off control according to the teaching of present disclosure. The circuit shown in FIG. 3 introduces advantages to the circuitry in FIG. 2 by reducing component count and size and avoiding the extra dissipation and resulting thermal effects of circuit 200. Since the non-isolated Buck design does not provide input to output isolation, assembling of the LED driver inside a light bulb enclosure provides a safety feature by isolating the power supply from the user.

Buck converter 300 may receive a rectified voltage $V_{in}$ 310 at input port 315 from front-end stage 305 similar to rectified voltage $V_{in}$ 110 in FIG. 1, received input port 115 from front-end stage 105 of Buck converter 100. Buck converter 300 may include input capacitor $C_1$ 312 coupled between the high side positive rail and the low side negative rail (coupled to ground 301) of input port 315 for providing a low-impedance and decoupling path for the switching noise current and may also function as a switching noise filter. When used with PFC, input capacitor C1 312 may have a relatively low capacitance value to maintain a high power factor. However, when PFC is not used, input capacitor $C_1$ 312 may have a relatively large value to provide a smooth dc rectified voltage $V_{in}$ 310 to the Buck stage of Buck converter 300.

In FIG. 3, the front-end stage 305 for a non-dimming LED driver, such as that shown in FIG. 1, may include coupling to line supply voltage $V_{AC}$ 102, EMI filter 106, and rectifier bridge 108 for rectifying the line supply voltage $V_{AC}$ 102. Front-end stage 305 may further include additional circuitry for surge protection or other functions. The front-end stage 305 provides the rectified voltage $V_{in}$ 310 to input port 315 of the Buck converter power stage.

For a dimming LED driver, a low cost leading edge Phase Control Triac Dimmer may be included within front-end stage 305 along with additional circuitry known to those of ordinary skill in the art to support the dimming functionality. For example, due to low power consumption of LED lighting, the current drawn by the lamp may go below the holding current of the TRIAC, causing undesirable behavior, such as limited dim range and flickering due to TRIAC inconsistent firing or due to ringing current of input capacitance inrush charging when the TRIAC turns on (that current may fall to zero and flicker). To overcome these issues, a Passive Damper and Passive RC Bleeder may also be included within front-end stage 305. It is appreciated that additionally circuitries required in the front-end stage 305 are not shown in FIG. 3 to avoid obscurity and are known to those skilled in the art.

Buck converter 300 may include a Buck power train formed by high side switcher unit U1 320 (power switch 323 plus controller 325), free-wheeling diode D1 370, Buck inductor L1 360, and output capacitor $C_O$ 375. Buck converter 300 may further optionally include diode 314 at its input and resistor 376 at its output. Diode 314 may be used to prevent reverse current and a negative voltage that may otherwise appear across the drain-source of power switch 323. This may be especially useful when buck converter 300 is used with PFC, since input capacitor $C_1$ 312 may have a relatively small capacitance value. This may cause the rectified voltage $V_{in}$ 310 at input port 315 to approach zero at the zero-crossing of the line ac voltage. The remaining components of Buck converter 300 may be used for sensing the output (e.g., output voltage $V_O$ 381 (281 in FIG. 2) and/or output current $I_O$ 382 (282 in FIG. 2)) of the converter and will be described in greater detail below.

In one example, power switch 323 may include a MOSFET device receiving gate signal 327 from controller 325 for enabling and disabling of MOSFET switching cycles (e.g., on-off control). Switcher unit U1 320, in conjunction with diode D1 370, inductor L1 360, and output capacitor $C_O$ 375, transfers energy from input port 315 to the output and also regulate the output of the converter (e.g., output voltage $V_O$ 381 and/or output current $I_O$ 382).

In one example, switch 323 may include a high-voltage power MOSFET and may be incorporated along with controller 325 into a single IC having a monolithic or hybrid structure.

As shown in FIG. 3, the drain terminal D 321 of switcher unit U1 320 is coupled to the positive end of the dc rectified voltage $V_{in}$ 310 at input port 315 through a diode 314. As mentioned above, diode 314 may be used to prevent reverse current from flowing through switcher unit U1 320. Source terminal S 322 of switcher unit U1 320 is coupled to the cathode of freewheeling diode D1 370.

In some examples, the core size of Buck inductor L1 360 may be selected to avoid inductor saturation at maximum current and may be optimized for higher system efficiency. Output capacitor $C_O$ 375 may be selected to give an output current ripple of less than ±50%. The bypass terminal BP 324 of switcher unit U1 320, which may serve as the supply terminal for controller 325, may be coupled to capacitor 329 for providing local decoupling for this terminal.

In operation during start-up, capacitor 329 may be charged to a functional threshold (e.g., ~6 V) from an internal high-voltage current source/supply connected to the drain terminal D 321 (e.g., it can be the internal tap terminal of the MOSFET coupled to the drain). After capacitor 329 is charged to the functional threshold, the switcher unit U1 320 may begin switching. It should be appreciated that during normal operation, the supply current to bypass terminal BP 324 may also be provided from output $V_O$ 381 (after inductor L1 360) via diode module 354 and resistor 358. The value of capacitor 329 for a dimmable LED driver may be selected to have a value sufficient (e.g., a value of around 47 uF) to enable the IC to maintain operation during deep dimming (e.g., when a TRIAC dimmer in front-end portion 305 is not conducting for much of each ac line half-cycle). In such a condition in which both internal supply through the MOSFET drain (e.g., the drain tap supply) and supply from the converter output $V_O$ 381 by sharing current of the inductor L1 360 through diode module 354 and resistor 358 are not present or are not sufficiently strong, the bypass terminal BP 324 may receive power from capacitor 329.

It should be appreciated that utilizing multiple series-coupled diodes in module 354 provides low junction capacitance and fast recovery to minimize the current that is pulled from the feedback terminal FB 326 when charging the reverse capacitance of module 354 whenever switch 323 turns on in each switching cycle. However, in some examples, instead of having multiple series-coupled diodes within module 354, a single ultrafast diode may be used within module 354 to reduce the junction capacitance. If such a diode is used within diode module 354, slightly poorer output regulation may result.

In the example shown in FIG. 3, the current sense for output current regulation of LED load 380 may be provided by sense resistor module 344. Sense resistor module 344 may be coupled between ground 301 and common coupling point 390 of inductor L1 360 and power switch 323. Sense resistor module 344 may include one or more resistors coupled in series or parallel and may be used to sense the current in freewheeling diode 370. The power rating and total value of the resistor module 344 may be adjusted to regulate and center the output current rating at the nominal input voltage. The optional capacitor 346 may be used to bypass and filter the high-frequency component of the circulating current through diode D1 370, resulting in lower root-mean-squared (RMS) dissipation on the current sensing circuit and improved overall efficiency. Resistor 342 and capacitor 345 may provide additional filtering to lower the ripple voltage fed to the feedback terminal FB 326 of the switcher unit U1 320 for improved regulation.

In one example, the output current feedback signal sensed by the voltage drop across sense resistor module 344 and filtered by low pass RC filter (resistor 342 and capacitor 345) may maintain the operating point such that the average voltage on feedback terminal FB 326 in steady-state operation is around 290 mV. For LED driver applications, the output inductor L1 360 may be operated in continuous or discontinuous conduction mode. In some examples, better accuracy may be obtained in continuous conduction mode in which constant current control and the current regulation may be sampled during the discharge/decay in the energy of output inductor L1 360, which may occur when switch 323 is turned off and current is flowing through freewheeling diode D1 370.

In the schematic of FIG. 3, buck converter 300 may also be protected against over voltage in the event of an accidental open load condition by monitoring the voltage across the output inductor during energy decay and discharge, which may occur when switch 323 in the switcher unit U1, 320 is turned off and current is flowing/circulating through the freewheeling diode D1 370. If the output voltage $V_O$ 381 exceeds the threshold/limit due to an open circuit (e.g., when LED load 380 is disconnected), the over voltage condition may be detected and limited by Zener diode VR1 356. Zener diode VR1 356 may set the over-voltage protection (OVP) threshold, forcing the switcher unit U1 320 to disable switching of switch 323 and enter the cycle-skipping mode by exceeding the current threshold of the feedback terminal FB 326.

During open load conditions, because of the leakage currents flowing to the output capacitor $C_O$ 375 even when switcher unit U1 320 is off, the output capacitor Co 375 may be charged to a voltage that exceeds the threshold of Zener diode VR1, 356. The discharge resistor 376 (also referred to as a preload resistor) coupled to the output may be used to discharge leakage current from output capacitor $C_O$ 375 and to limit the maximum output voltage by partially discharging the output during open load. However, this may result in a tradeoff in efficiency during normal operation. The discharge/preload resistor 376 may also ensure that the LED load 380 turns off quickly when ac line supply voltage $V_{AC}$ 102, and consequently, the input voltage $V_{in}$ 310, is removed.

In one example, the value of discharge/preload resistor 376 coupled to the output to help suppress the overshoot may be a value sufficiently large to reduce the effect of the resistive dissipation on the efficiency during normal operation. It is appreciated that in designs that require absolute OVP for the output capacitor, a Zener diode with a breakdown voltage greater than or equal to breakdown voltage of Zener diode VR1, 356 may also be coupled across the output.

It should be appreciated that utilizing an integrated switcher device U1 320 similar to that shown in FIG. 3 produces a highly efficient converter having a low component count that is suitable for any compact design applications by reducing the size and heat dissipation of the device.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A feedback sense circuit for a power converter, wherein the power converter transfers current from an input port to a regulated output through an inductor during an on time of a power switch, and wherein current circulates through the inductor and a freewheeling diode during an off time of power switch, and wherein switching of the power switch is controlled by a controller in response to a feedback signal received on a feedback terminal of the controller, the feedback sense circuit comprising:
   a sense resistor module comprising a first end and a second end, wherein the first end of the sense resistor module is coupled to a cathode of the freewheeling diode, and wherein the second end of the sense resistor module is coupled to a common coupling point of the inductor and the power switch;
   a first resistor comprising a first end and a second end, wherein the first end of the first resistor is coupled to the first end of the sense resistor module, and where the second end of the first resistor is coupled to the feedback terminal of the controller; and
   a first capacitor coupled between the feedback terminal of the controller and the common coupling point of the inductor and the power switch.

2. The feedback sense circuit of claim 1 further comprising:
   a diode module comprising an anode end and a cathode end, wherein the anode end of the diode module is coupled to the output of the power converter; and
   a zener diode, wherein a cathode of the zener diode is coupled to the cathode end of the diode module, and wherein an anode of the zener diode is coupled to the feedback terminal of the controller.

3. The feedback sense circuit of claim 1 further comprising:
   a second resistor coupled between the cathode end of the diode module and a supply terminal of the controller; and
   a second capacitor coupled between the supply terminal of the controller and the common coupling point of the inductor and the power switch.

4. The feedback sense circuit of claim 1 further comprising a third capacitor coupled across the sense resistor module.

5. The feedback sense circuit of claim 1, wherein the diode module comprises one or more diodes coupled in series.

6. The feedback sense circuit of claim 1, wherein the sense resistor module comprises one or more resistors coupled in series or in parallel.

7. The feedback sense circuit of claim 1, wherein the power converter is a Buck non-isolated light-emitting diode (LED) driver.

8. The feedback sense circuit of claim 7, wherein the power converter is included within an LED lamp enclosure.

9. A power converter for transferring current from an input port to a regulated output, the power converter comprising:
   a power switch;
   a controller coupled to the power switch, wherein the controller is configured to control switching of the power switch based on a feedback sense signal received at a feedback terminal of the controller;
   an inductor comprising a first end and a second end, wherein the first end of the inductor is coupled to the power switch, and wherein the second end of the inductor is coupled to the output of the power converter;
   a freewheeling diode having an anode and a cathode, wherein the anode of the freewheeling diode is coupled to the output of the power converter; and
   a current sense circuit comprising:
      a sense resistor module comprising a first end and a second end, wherein the first end of the sense resistor module is coupled to the cathode of the freewheeling diode, and wherein the second end of the sense resistor module is coupled to the first end of the inductor;
      a first resistor comprising a first end and a second end, wherein the first end of the first resistor is coupled to the first end of the sense resistor module, and where the second end of the first resistor is coupled to the feedback terminal of the controller; and
      a first capacitor coupled between the feedback terminal of the controller and the first end of the inductor.

10. The power converter of claim 9, wherein the controller is configured to control switching of the power switch by on-off control by enabling and disabling the switching of the switch.

11. The power converter of claim 10, wherein the controller is configured to disable switching of the power switch in response to the feedback sense signal going above a threshold value.

12. The power converter of claim 9, wherein the feedback sense circuit further comprises:
   a diode module comprising an anode end and a cathode end, wherein the anode end of the diode module is coupled to the output of the power converter; and
   a zener diode, wherein a cathode of the zener diode is coupled to the cathode end of the diode module, and wherein an anode of the zener diode is coupled to the feedback terminal of the controller.

13. The power converter of claim 12, wherein the diode module comprises one or more diodes coupled in series.

14. The power converter of claim 12, wherein the feedback sense circuit further comprises:
   a second resistor coupled between the cathode end of the diode module and a supply terminal of the controller; and
   a second capacitor coupled between the supply terminal of the controller and the first end of the inductor.

15. The power converter of claim 14, wherein a high voltage terminal of the power switch is coupled to the second capacitor to provide a supply to the controller.

16. The power converter of claim 9, wherein the sense resistor module comprises one or more resistors coupled in series or in parallel.

17. The power converter of claim 9 further comprising a third capacitor coupled across the sense resistor module.

18. The power converter of claim 9, wherein the power switch and the controller are integrated in an integrated circuit package having a monolithic or hybrid structure.

19. The power converter of claim 9, wherein the output is coupled to a load comprising a plurality of light-emitting diodes (LEDs), and wherein the power converter is an LED driver.

20. The power converter of claim 19, wherein the power converter is included within a lamp enclosure.

* * * * *